(12) United States Patent
Lamba et al.

(10) Patent No.: US 11,163,457 B2
(45) Date of Patent: Nov. 2, 2021

(54) AUTHORIZING MODIFICATION OF RESOURCES

(71) Applicant: International Business Machines Corporation, Armonk, NY (US)

(72) Inventors: Amit H. Lamba, Buffalo Grove, IL (US); Mark D. Seaborn, Algonquin, IL (US); Akila Srinivasan, Carpentersville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 16/449,802

(22) Filed: Jun. 24, 2019

(65) Prior Publication Data

US 2020/0401324 A1 Dec. 24, 2020

(51) Int. Cl.
*G06F 3/06* (2006.01)
*H04L 29/08* (2006.01)

(52) U.S. Cl.
CPC ............ *G06F 3/0619* (2013.01); *G06F 3/064* (2013.01); *G06F 3/067* (2013.01); *G06F 3/0659* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,171,533 B2 | 5/2012 | Fleming et al. | |
| 9,483,539 B2 | 11/2016 | Leggette et al. | |
| 10,216,949 B1 * | 2/2019 | McKelvie | G06F 21/6227 |
| 10,291,622 B1 * | 5/2019 | Rossman | G06F 21/40 |
| 10,387,247 B2 * | 8/2019 | Baptist | G06F 16/162 |
| 2007/0261103 A1 * | 11/2007 | Viavant | G06F 21/40 726/2 |
| 2017/0111331 A1 | 4/2017 | Auradkar et al. | |
| 2017/0153821 A1 * | 6/2017 | Baptist | G06F 3/0689 |

(Continued)

OTHER PUBLICATIONS

Definition—Quorum, Oxford Languages (Year: 2020).*

(Continued)

*Primary Examiner* — Ryan Bertram
*Assistant Examiner* — Edmund H Kwong
(74) *Attorney, Agent, or Firm* — Anthony England; Andrew D. Wright; Roberts Calderon Safran & Cole, P.C.

(57) ABSTRACT

A method for execution by a computing device includes determining a set of actor parties required to authorize a change of protection status of a stored resource from a protected status to an unprotected status. A minimum quorum is determined for each of the set of actor parties. A plurality of authorizations to change the protection status of the resource to the unprotected status are received from a plurality of requestors via the network. A plurality of subsets of the plurality of requestors corresponding to the set of actor parties are identified. The protection status of the resource is set to the unprotected status in response to determining, for every one of the set of actor parties, that a number of requestors in a corresponding one of the plurality of subsets is greater than or equal to the minimum quorum for the one of the set of actor parties.

20 Claims, 11 Drawing Sheets

(56) References Cited

U.S. PATENT DOCUMENTS

2017/0371573 A1* 12/2017 Kim ...................... G06F 3/0622
2018/0239896 A1   8/2018 Kato et al.

OTHER PUBLICATIONS

Anonymous; A Method and System for Enabling Restricted Anonymous Access Operations; Feb. 27, 2017; 2 pgs; IP.com No. IPCOM000249435D; IP.com.

Anonymous; Method and System for Enabling Efficient Storage of Data Slices in a Dispersed Storage Network Based Object Storage Systems; Nov. 15, 2018; 5 pgs; IP.com No. IPCOM000256240D; IP.com.

Anonymous; Method and System for Enablling Identity-based Data Policies in a Dispersed Storage Network (DSN) Jan. 30, 2018; 3 pgs; IP.com No. IPCOM000252624D; IP.com.

List of IBM Patents or Patent Applications Treated as Related, dated Sep. 15, 2020, 1 page.

Specification "Authorizing Modification of Resources" and drawings in related U.S. Appl. No. 16/571,419, filed Sep. 16, 2019, 57 pages.

Office Action dated Sep. 29, 2020 in related U.S. Appl. No. 16/571,419, 16 pages.

Final Office Action dated Feb. 9, 2021 in related U.S. Appl. No. 16/571,419, 18 pages.

Notice of Allowance dated Jul. 6, 2021 in related U.S. Appl. No. 16/571,419, 9 pages.

* cited by examiner

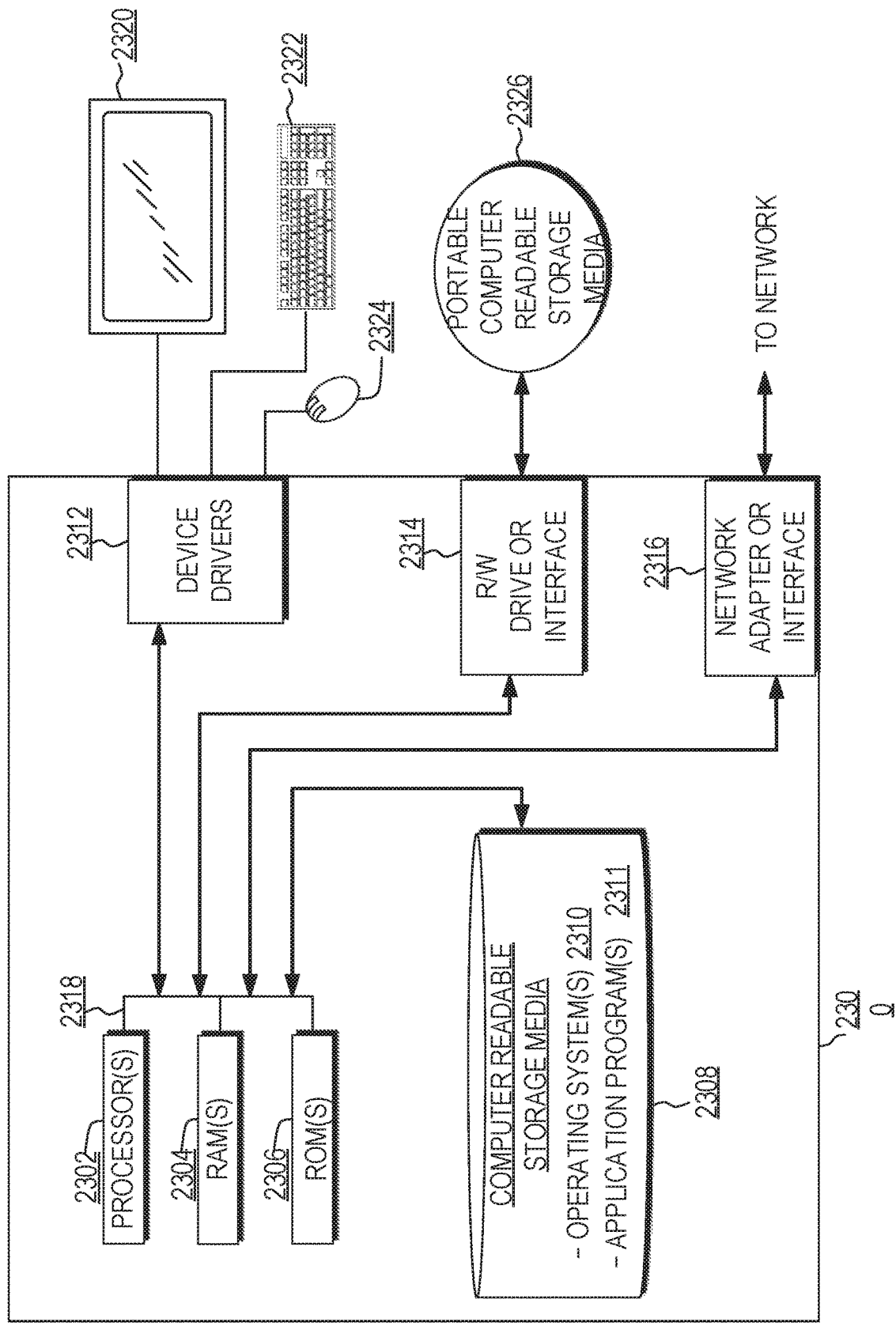

AUTHORIZING MODIFICATION OF RESOURCES

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 13 depicts a block diagram of a computing device according to various embodiments of the present invention.

DETAILED DESCRIPTION OF THE INVENTION

Figure 1:
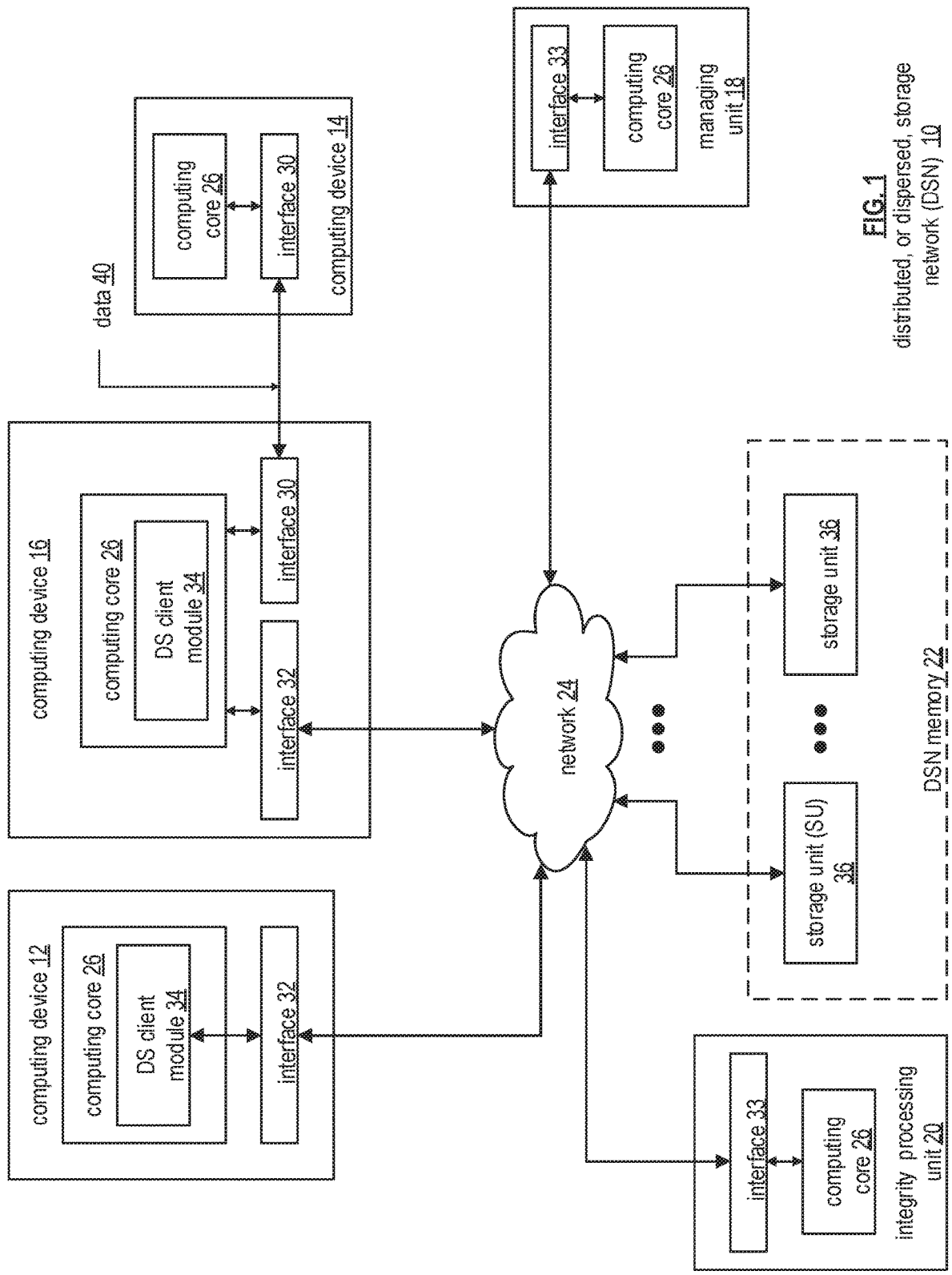
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
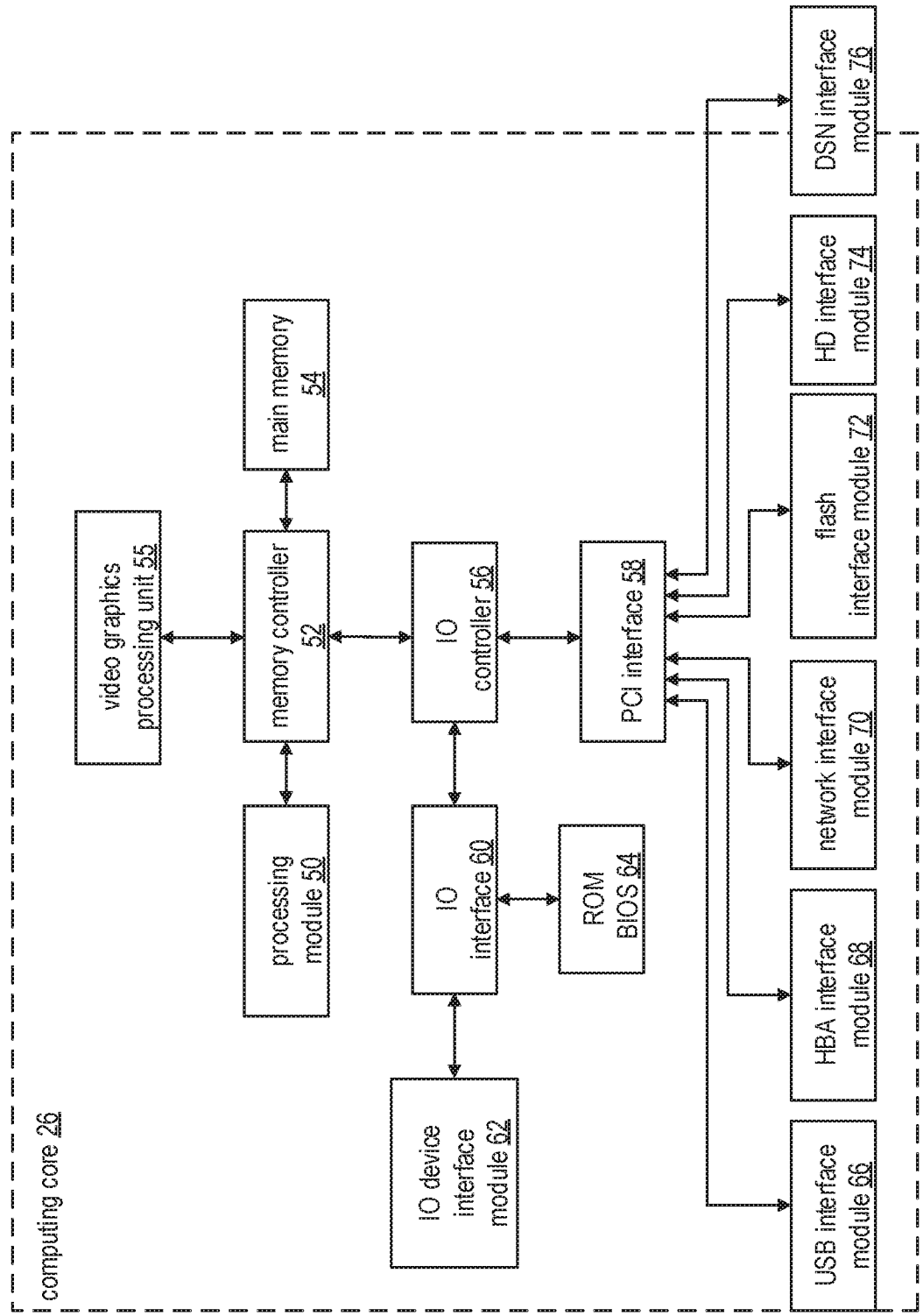
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
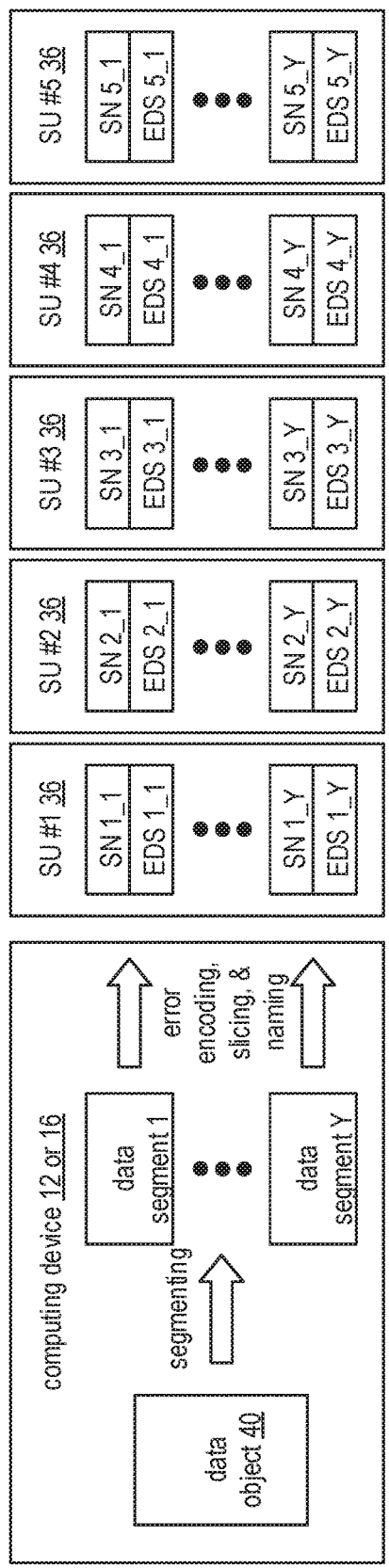
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). As used herein, the dispersed storage error encoding parameters can be interchangeably referred to as IDA parameters, and T can be interchangeable referred to an IDA width threshold of a dispersed storage error encoding function.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
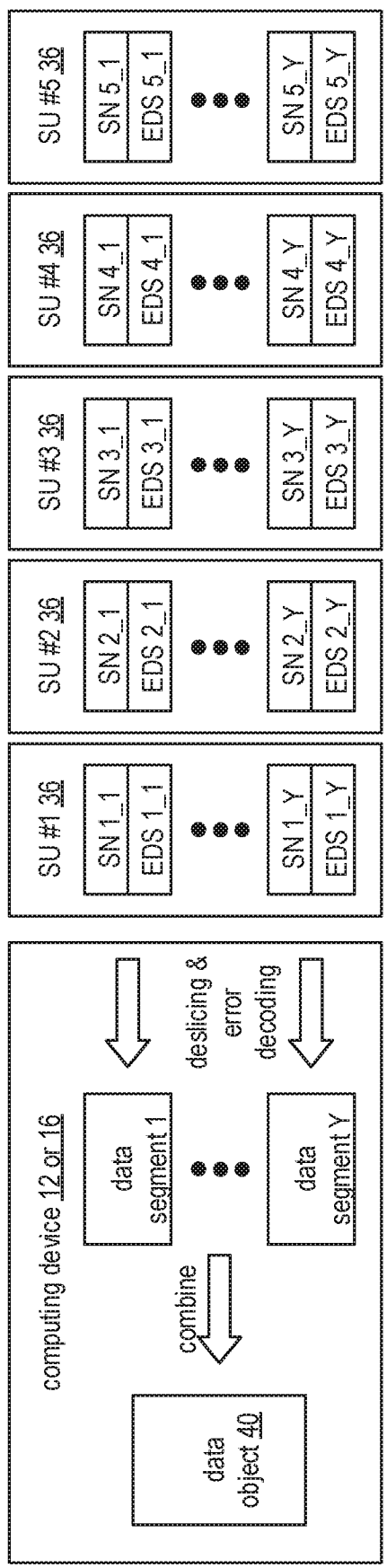
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
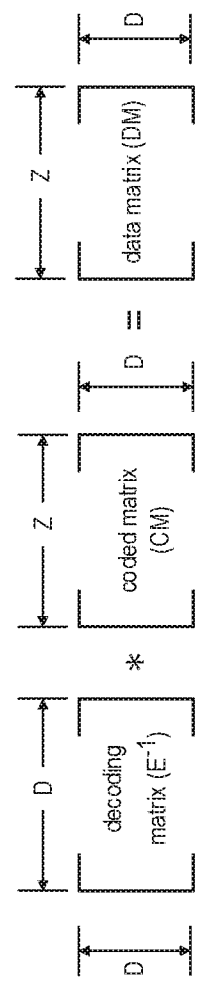
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
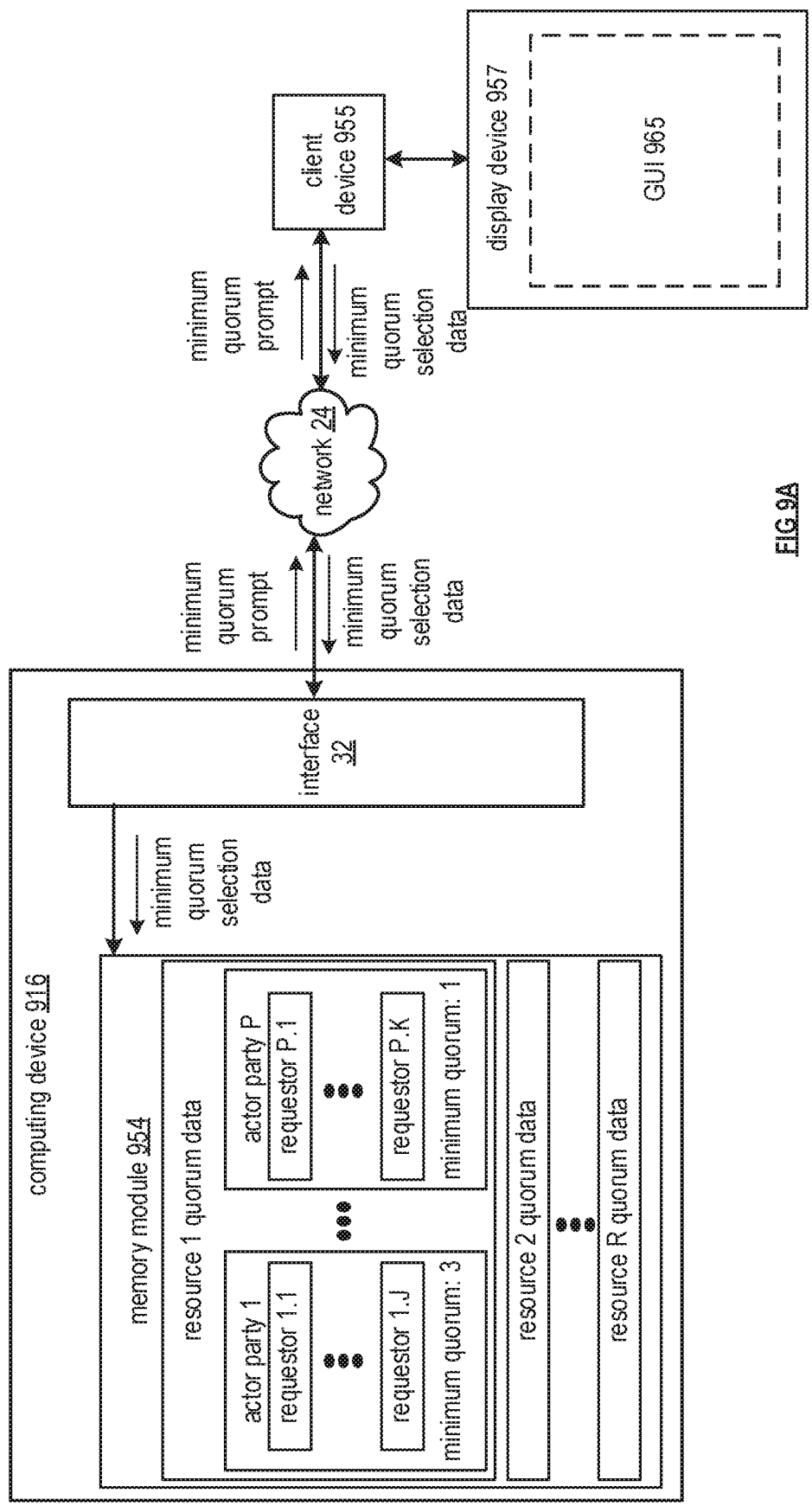
FIGS. 9A-9C are schematic block diagram of an embodiment of a dispersed or distributed storage network (DSN) in accordance with the present invention.
Figure 9B:
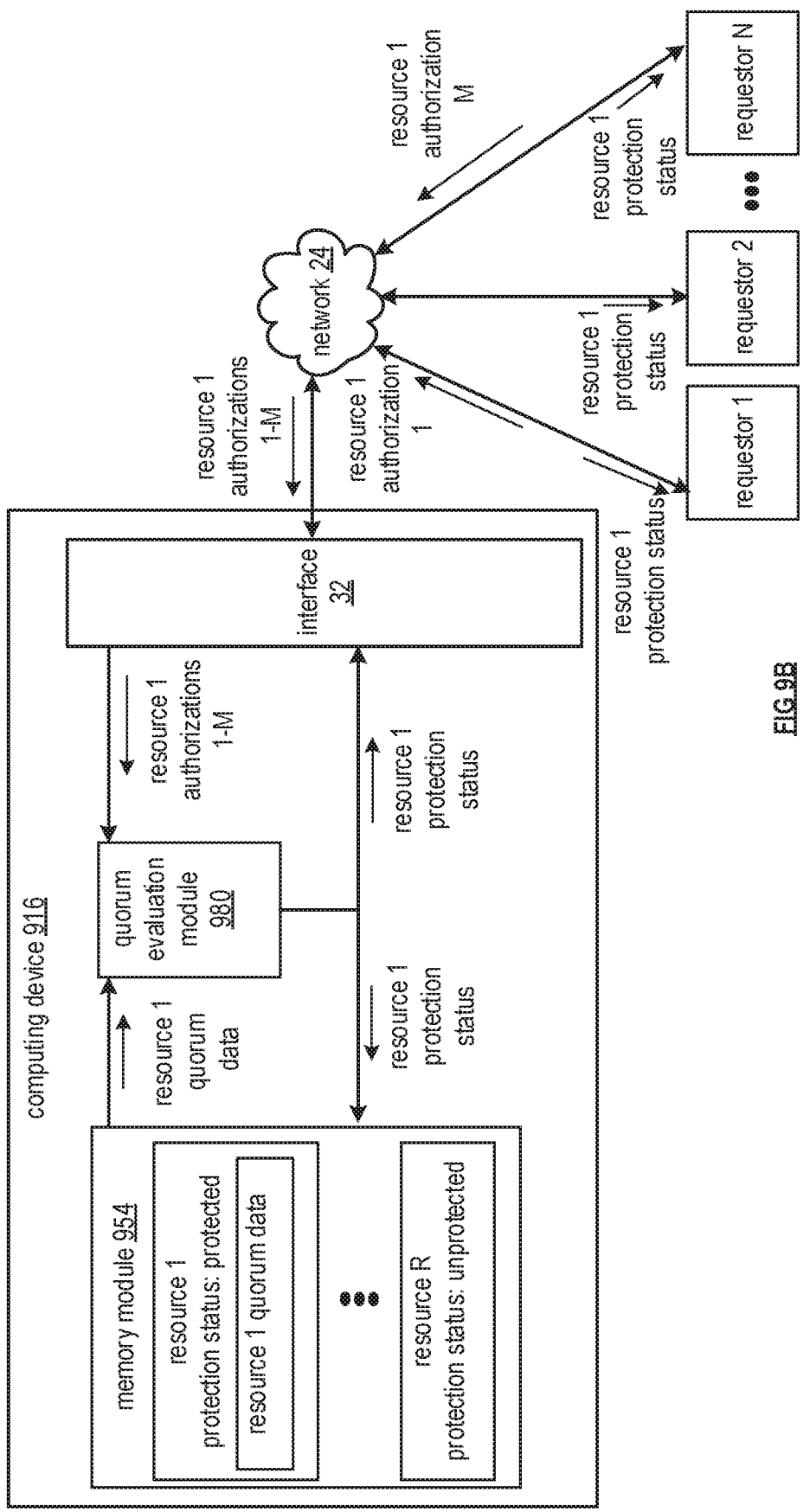
Figure 9C:
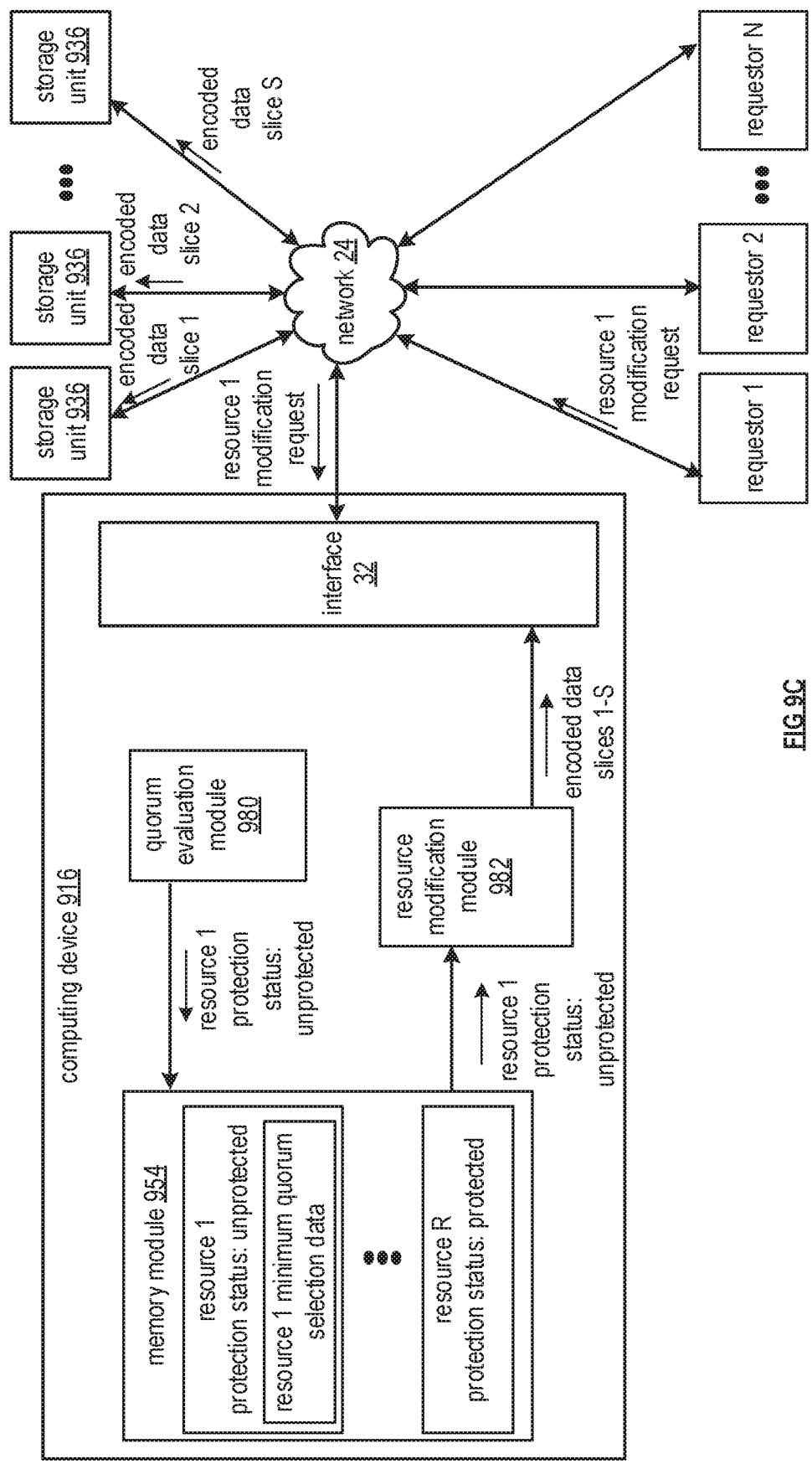

FIGS. 9A-9C illustrate schematic block diagrams of another embodiment of a dispersed storage network (DSN) that includes a computing device 916 and the network 24 of FIG. 1. The computing device 916 can include the interface 32 of FIG. 1, the computing core 26 of FIG. 1, and/or the DS client module 34 of FIG. 1. The computing device 916 can be implemented by utilizing a computing device 12-16 of FIG. 1. For example, the computing device 916 can be implemented as a dispersed storage processing agent for computing device 14 as described previously, and/or can be implemented as a dispersed storage and task (DST) processing unit of the DSN. The DSN functions to authorize modification of data stored in the DSN.

As illustrated in FIG. 9A, the computing device 916 can communicate with at least one client device 955, which can include a processor and memory enabling the client device to display a graphical user interface (GUI) 965 via a display device 957, enabling the client device to receive, via the network, prompts or other application data for display via the GUI 965, and/or enabling the client device to generate data based on user input responding to prompts displayed via GUI 965, for transmission via network 24. For example, client device 955 can be implemented by utilizing the computing device 12, 14, and/or 16 of FIG. 1 and/or can include a computing core 26 of FIG. 2.

As illustrated in FIG. 9B, the computing device 916 can communicate with a plurality of requestors 1-N. Each requestor 1-N can include a processor and memory enabling the requestor to generate authorizations for transmission via network 24, for example, based on user input to a GUI displayed by a display device of each requestor 1-N. For example, some or all requestors 1-N can be implemented by utilizing the computing device 12, 14, and/or 16 of FIG. 1 and/or can include a computing core 26 of FIG. 2. One or more of the requestors 1-N can correspond to the at least one client device 955 of FIG. 1.

As illustrated in FIG. 9C, the computing device 916 can communicate with a plurality of storage units 936 via network 24. The plurality of storage units 936 can correspond to some or all of a set of storage units 36 of a DSN memory 22.

The DSN can be operable to store resources in memory. A resource can include a data object and/or one or more data segments of a data object, for example, as one or more encoded data slices stored in an IDA width threshold number of the plurality of storage units 936. Alternatively or in addition, a resource can correspond to a single encoded data slice stored by a storage unit 936. Alternatively or in addition, a resource can correspond any data stored in one or more storage units 936 of the DSN. Some or all resources can be assigned a protection status, which can correspond to a protected status, or an unprotected status. A resource with a protected status has the property that it can be read but cannot be modified and/or deleted, until the protection status of the resource changes from protected to unprotected. In some embodiments, a resource is automatically assigned the status of protected from the time it is written to memory, and the protected status of the resource is maintained until a corresponding protection period has elapsed.

For example, the computing device 916 can receive a resource to be written to memory, for example, from one of the requestors via the network. The computing device can write the resource to memory by dispersed storage error encoding one or more data segments of the resource into a plurality of encoded data slices, and can transmit the plurality of encoded data slices to a corresponding IDA width threshold number of storage units 936. The computing device can maintain protection status information for the resources it manages, for example, in local memory by utilizing a memory module 954, which can be implemented by utilizing the main memory 54 of FIG. 2 or any other memory. Alternatively, the protection status of the resources stored in memory can be stored by a different entity, and the computing device can retrieve and/or alter the protection status of some or all of the resources it manages via network 24. In particular, in response to writing a resource to memory, the computing device can set the status of the resource as protected, and can change the status of the resource to unprotected in response to determining that the protection period has elapsed. This property of protecting a resource for a protection period can be applied for use cases related to security, regulatory compliance etc.

However, there may be certain scenarios where an exception is required. The DSN can function to provide a mechanism to unprotect a protected resource, even before the protection period has elapsed. Regulatory requirements can dictate that the exception mechanism built into the system be designed to prevent a malicious actor from abusing it and unprotecting resources. Explicit business and regulatory clearance can be required to grant a DSN operator and/or administrator the authorization to unprotect a protected resource. In addition, an end user of the DSN memory also need to be assured that their protected resources cannot be unprotected without their explicit authorization.

A computing device 916, or other entity of the DSN, can achieve this by utilizing an M of N access control approach. In this approach, the system can be configured with a minimum quorum required to execute an unprotect operation and/or to otherwise change the status from protected to unprotected, for example, in conjunction with a request to modify and/or delete the resource. This unprotect operation is successfully completed if and only if the minimum quorum authorizations have been received. As long as the number of authorizations received is below the required quorum, the resource remains protected. This approach guarantees that a single malicious user cannot unprotect the resource. However, this approach alone provides no assurance that all relevant parties have participated in the authorization.

The computing device 916, or other entity of the DSN, can further ensures that all relevant parties have participated to authorize the unprotect operation. To achieve this, minimum quorum is quantified per actor party (relevant party). In order to achieve a quorum for performing the unprotect operation, all actor parties need to participate. An actor party can be an individual. Alternatively, an actor party can be a group of individuals, where any member from that group can help achieve the minimum quorum required for that actor party.

Any number of actor parties can be defined for a resource, where each actor party can have any number of possible individuals or other requesting entities, and where each actor party can have any minimum quorum that is at least one and is less than or equal to the total number of possible requesting entities in the actor party. For example, as illustrated in FIG. 9A, a computing device 916 can store quorum data for each of a plurality of resources 1-R managed by the computing device and/or stored by the computing device. The quorum data for some or all of the plurality of resources 1-R can be the same or different.

In the example illustrated in FIG. 9A, resource 1 has quorum data indicating actor parties 1-P. Actor party 1 of resource 1 includes J possible requestors 1.1-1.J. The minimum quorum for actor party 1 of resource 1 is equal to three, but can be alternatively equal to any number that is greater than or equal to 1 and less than or equal to J. Actor party P of resource 1 includes K possible requestors P.1-P.K, and has a minimum quorum of one. The possible requesting entities between different actor parties can be mutually exclusive, where no two actor parties include a same requestor. Alternatively, a same requestor can be included in multiple actor parties, but may not be allowed to be counted towards minimum quorums for more than one actor party.

The actor parties can correspond to different roles of various requestors and/or individuals in the system. For example, the system can be configured such that the minimum quorum requires at least one authorization from an end user (owner) of the resource, and at least once authorization from a single operator of the system, such as an operator and/or administrator of the DSN. One actor party can correspond to an operator party that includes the single operator, and the minimum quorum can be satisfied for the operator party when the single operator provides authorization. Another actor party can correspond to the owner party, where any one of a plurality of end users can provide authorization to satisfy the minimum quorum for the owner party. Alternatively the minimum quorum can be greater than one for the owner party, as it includes a plurality of end users, and this minimum number of end users must provide authorization to satisfy the minimum quorum for the owner party.

In some embodiments, the plurality of possible requestors for an actor party can be enumerated in the quorum data by identifiers of client devices and/or identifiers of the corresponding individuals. Alternatively, the plurality of possible requestors for an actor party can be identified based on a set of criteria that must be met for a particular requestor to fall within the actor party. In these embodiments, the number of actors in a particular actor party may be unknown.

The quorum data for some or all resources can be determined by an administrator of the DSN, an owner of the resource, a requestor that originally sent the resource to the computing device 916 for storage in the DSN, and/or by another entity via interaction with GUI 965 displayed by a display device 957 of a client device 955 associated with the administrator, owner of the resource, or other entity. For example, application data and/or one or more prompts can be sent to the client device 955 for display to the user via GUI 965, enabling GUI 965 to display at least one prompt for the user to provide minimum quorum selection data. The user can interact with GUI 965 to provide user input indicating minimum quorum selection data. The minimum quorum selection data can include some or all of the quorum data for one or more of the resources 1-R. The client device 955 can transmit the minimum quorum selection data to the computing device 916, and the computing device can utilize the minimum quorum selection data to determine some or all of the quorum data for some or all of the resources. Once quorum data for a resource is determined, it can be stored in local memory module 954 and/or can be stored in another memory for access by the computing device 916 via the network.

The GUI can be presented with built in quorum requirements, ensuring that selections made by the user are in accordance with the quorum requirements. For example, the GUI can enforce that a sum of minimum quorums for all of the set of actor parties is greater than one, or a different predefined number. For example, if the sum must be greater than one, this can include requiring the minimum quorum selection data to adhere to a number of actor parties in the set of actor parties being greater than one, and can include requiring the minimum quorum for each the set of actor parties being greater than or equal to one. Alternatively, the user can be allowed to select only one actor party, and the GUI can require that the minimum quorum for the single actor party be greater than or equal to two if only one actor party is selected by the user.

Different client devices 955 corresponding to different administrators, different owners of different resources, different requestors that originally sent different resources for storage, and/or other different entities can display GUI 965 to different users, enabling these different resources to generate minimum quorum selection data for different resources for transmission to the computing device 916 at the same or different times. In some embodiments, the minimum quorum selection data is generated for a resource and transmitted by a client device 955 in conjunction with sending the resource to the computing device 916 for storage, ensuring that the resource has quorum data from the times it is stored. Alternatively, the minimum quorum selection data can be generated for all resources and/or any resource that satisfies a particular condition or falls within a particular category. In this fashion, quorum data can be set before some or all corresponding resources are sent to the computing device for storage, again ensuring that resources have quorum data from the time they are stored.

In some embodiments, the minimum quorum for a particular actor party can be a predefined function of the number of individuals in the actor party. For example, to require that a majority of end users authorize the unprotecting of the resource, the minimum quorum can equal to half of the number of end users in the owner party. Different actor parties can have different minimum quorum that are equal to different numbers and/or that correspond to different proportions of the number of individuals in the corresponding actor party. The same or different predefined function for some or all actor parties can be utilized by the client device 955 to generate the minimum quorum selection data and/or can be indicated in the minimum quorum selection data based on user input indicating the predefined function.

Some or all of the quorum data for some or all resources can be determined automatically by the computing device 916. For example, the computing device 916 can automatically determine the minimum quorum for some or all actor parties in response to receiving minimum quorum selection data indicating all possible requestors in these actor parties based on the predefined function. Alternatively or in addition, the predefined function for calculating minimum quorum for some or all actor parties can be provided by the client device in the minimum quorum selection data, and the computing device can automatically apply the predefined function to a determined number of possible requestors in these actor parties to calculate the value of the minimum quorum. For example, the computing device can automatically determine owners of the resource and/or actor parties for the resource based on the requestor that sent the resource, based on metadata of the resource, and/or based on other qualities of the resource. The minimum quorum selection data generated based on the via user input to client device 955 can indicate a set of rules that the computing device can utilize to determine which actor parties will be utilized for a given resource and/or to determine the possible requestors for a given actor party based on qualities of a given resource.

In some embodiments, the source of a resource and/or an entity that sent the resource to the computing device to be written to memory is automatically included in one of the actor parties by the computing device, such as an owner party. In some embodiments, an operator of the DSN is always automatically included as the singular member of a required operator party by the computing device. In some embodiments, the operator of the DSN is determined based on an individual and/or entity associated with the client device 955 that sent minimum quorum selection data for one or more resources. For example, an individual that set some or all of the quorum data for one or more resources in the DSN via interaction with GUI 965 can be automatically be determined to be an operator of the DSN, and can be automatically included in the operator party for the same or different resource for which the quorum data was sent by this operator. Alternatively or in addition, an owner of a resource is determined based on an individual and/or entity associated with the client device 955 that sent minimum quorum selection data for the resource. For example, owners can be responsible for setting some or all of the quorum data for their resources, and an individual that set some or all of the quorum data for a particular resource via interaction with GUI 965 can automatically be determined to be an owner of the resource, and can be automatically included in the operator party for the resource.

FIG. 9B illustrates an embodiment of unprotecting a protected resource by determining an overall quorum has been achieved. When performing an unprotect operation, each of the requestors that authorize the unprotecting of a resource can present their credentials. The credentials identify the requestor which actor party they fall within in performing the operation. The DSN memory can use this information to keep track of the number of authorizations received and if the quorum has been met across all actors.

Consider a plurality of requestors N, which can correspond to all possible requestors across all actor parties for resource 1. A proper subset of the plurality of requestors N can generate and transmit authorizations to unprotect resource 1. For example, one or more of the requestors 1-N can utilize a GUI displayed on a corresponding display device to prompt a user to provide and/or deny authorization to unprotect a resource, and authorizations can be generated and sent by the requestor when the user indicates they wish to provide authorization to unprotect the resource via user input to the GUI.

As illustrated, M of the N possible requestors can transmit their authorizations to unprotect resource 1, where M is less than N. The computing device 916 can receive these authorizations 1-M. A quorum evaluation module 980 can be implemented by utilizing at least one processor of the computing device. The protection status evaluation module can determine whether authorization is granted by comparing the authorizations 1-M for resource 1 to the quorum data for resource 1, for example, by fetching the quorum data for resource 1 from memory. The quorum evaluation module 980 evaluation can identify which ones of requestors 1-M that sent the authorizations 1-M correspond to each actor party indicated in the quorum data for resource 1. In particular, a requestor can be compared to enumerated identifiers in an actor party of resource 1, where the requestor is determined to be a member of the actor party if an identifier of the requestor matches one of the enumerated identifiers in the actor party. Similarly, a requestor can be compared to a set of criteria defining members of an actor party, where the requestor is determined to be a member of the actor party if the requestor is determined to compare favorably to the set of criteria. In some embodiments, credentials validating each requestor is generated and transmitted by each requestor in conjunction with the authorization. The computing device can utilize the credentials to validate and/or determine the identity of each requestor 1-M. These credentials can be compared to the enumerated identifiers and/or set of criteria of an actor party to determine whether the corresponding requestor is a member of the actor party.

The computing device 916 can thus identify a set of subsets of the requestors 1-M, where each of the set of subsets corresponds to one of the actor parties and includes only ones of the requestors 1-M determined to belong to the corresponding actor party. In some embodiments, at least one of the requestors 1-M is determined to belong to none of the actor parties for resource 1, and is thus included in none of the subsets. The computing device can compare the number of requestors in each subset to the minimum quorum of the corresponding actor party. The minimum quorum of an actor party can be determined to be met when the number of requestors in the subset for the actor party is greater than or equal to the value of the minimum quorum. The minimum quorum of an actor party can be determined to be unmet when the number of requestors in the subset for the actor party is less than the value of the minimum quorum.

In some embodiments, a minimum quorum's worth of authorizations must be received for each actor party for an overall quorum to be determined by the quorum evaluation module 980, ensuring that all actor parties have met their corresponding minimum quorum for an overall quorum to be reached. If this condition is met, the corresponding resource is changed from protected to unprotected, and modification and/or deletion of the resource can be facilitated. If this condition is not met, the corresponding resource is not changed to an unprotected status, and the protected status of the resource is maintained. For example, if a minimum quorum of any one of the actor parties is not met.

In other embodiments, only a proper subset of actor parties need to meet their corresponding minimum quorums for the overall quorum to be determined and for the resource to become unprotected, where the minimum quorum is not met for at least one of the actor parties. The quorum data can indicate whether or not minimum quorums must be met by every actor party, for example, based on an indication in the minimum quorum selection data received from the client device. If the quorum data indicates that minimum quorums need only be met by a proper subset of actor parties, the quorum data can further indicate which proper subsets are acceptable. For example, a plurality of different proper subsets of the actor parties with their minimum quorums met can all be valid solutions in establishing an overall quorum. These proper subsets can be the same or different in size. For example, some proper subsets may include all but one of the actor parties, other proper subsets are missing two or more of the actor parties. The number of actor parties required for different proper subsets can be a function of a determined importance and/or weight of the roles of the actor parties themselves. For example, a first proper subset of actor parties may include fewer actor parties than a second proper subset of actor parties in response the first proper subset including one or more actor parties that are more important than and/or whose authorization holds more weight than one or more actor parties in the second proper subset.

As discussed previously, additional roles for additional actor parties can also be specified to participate in order to form an overall quorum. As an example of less than all of the actor parties needing to meet their minimum quorums, the system can define an actor party that can serves as an arbitrator. An arbitrator party can help arbitrate any disputes between other actors and/or can provide authorization on behalf of a nonparticipating actor. In such embodiments, the quorum data can indicate that any combination of actor parties that includes all but one of the actor parties can be utilized to achieve overall quorum if the minimum quorums of all but one of the actor parties are met, because the arbitrator party is either included in the proper subset of actor parties to replace a nonparticipating actor party, or all of the other required actor parties are participating and thus the arbitrator party is not necessary. In some embodiments, the quorum data can specify that the arbitrator party can only be utilized to provide authorization on behalf of some actor parties, but not other actor parties, where these other actor parties are always required for overall quorum to be achieved.

In some embodiments, a secondary minimum quorum that indicates a higher number of required requestors than the first minimum quorum can be indicated for at least one actor party in the quorum data. If the secondary minimum quorum for an actor party is met, then the minimum quorum for another actor party need not be met for overall quorum to be achieved. If the first minimum quorum for this actor party is met but the secondary minimum quorum for this actor party is not met, then the minimum quorum for the other actor party must still be met for overall quorum to be achieved. For example, the first minimum quorum for an owner party can be equal to one, and the secondary minimum quorum for an owner party can be equal to half of the total number of end users. If this secondary minimum quorum of the owner party is met for a resource, then the resource can become unprotected even if the operator does not provide authorization. If at least one end user provides authorization but this secondary minimum quorum of the owner party is not met for a resource, the resource can only become unprotected if the operator also provides authorization.

In some embodiments, if the overall quorum is not met but is within a predefined threshold number of requestors away from the overall quorum, the computing device can transmit notifications requesting authorization of the resource to some or all remaining ones of the requestors that have not transmitted authorization and/or that have also not sent transmissions denying authorization. For example, if a particular actor party is one requestor and/or within a threshold number of requestors away from its minimum quorum, the requestors of these actor parties can be sent the notifications. The notification indicating a request to authorize the resource can be displayed by the requestor to a user via a display device. The notification can indicate the individuals and/or the entire actor parties that have already provided authorization. Authorizations of the resource can be received from some or all additional requestors wishing to provide authorization in response to the authorization request, and the quorum evaluation module 980 can be utilized to reevaluate whether quorum is reached based on these additional authorizations.

In some embodiments, the quorum data indicates a timeout window for authorization, which can be the same or different for different resources. Only authorizations received within a temporal period that does not exceed the timeout window, and/or only authorizations that are received after a time dictated by the time window and the current time, are considered by the resource modification module to determine whether overall quorum is met. In these embodiments, if at least one authorization from at least one requestor was determined to have been received outside the timeout window, and/or if it is determined that overall quorum is not reached but would have been reached if not for the timeout window, notifications can be sent to these requestors indicating that the requestors should retransmit their authorization to the computing device 916 if they still authorize unprotecting the resource. The computing device can then utilize subsequently retransmitted authorizations in evaluating whether overall quorum is met.

The computing device 916 can determine the resulting protection status of the resource based on whether or not overall quorum is determined to be met, where the protection status of the resource is changed to unprotected when overall quorum is met, and where the protection status of the resource is maintained as protected when overall quorum is not met. The resulting protection status and/or outcome of the quorum can be indicated in a notification generated by the computing device and transmitted to some or all of the requestors 1-N. This can include transmitting the outcome to requestors that did not provide authorization but are included as possible requestors for an actor party of the resource. Alternatively, the notification can be transmitted by the computing device 916 to only the requestors 1-M that provided authorization. The resulting protection can further be communicated to the memory, for example, when the protection status of the resource is to be changed.

As illustrated in FIG. 9C, when the protection status of resource 1 is determined to be changed to unprotected by the quorum evaluation module 980, the protection status of resource 1 can be changed in memory accordingly. A resource modification request can be received from a requestor via the network, indicating a request to modify and/or delete resource 1. A resource modification module 982 can be implemented by at least one processor of the computing device 916, and can be operable to modify the resource in memory of the DSN based on the modification request. This can include first querying the status of the resource in memory module 954 to verify that the resource is unprotected. If resource is unprotected, the modification can be facilitated by the resource modification module 982. This can include facilitating replacing, modifying, and/or deleting the resource currently stored in the DSN. For example, a modification request indicating a modified version of the resource can be utilized by the resource modification module 982 to generate a IDA width threshold number of encoded data slices 1-S for at least one data segment of the modified version of the resource by performing a dispersed storage error encoding function on the modified version of the resource, and the encoded data slices 1-S can be transmitted to storage units 936 to replace the previous version of the resource.

In some embodiments, the modification request is only executed by the computing device 916 if received from a requestor that is determined to belong to one of the actor parties of the resource. The computing device can determine whether the requestor belongs to an actor party of the resource as discussed in conjunction with FIG. 9B, for example, based on the quorum data for the resource and/or based on credentials provided by the requestor in conjunction with the modification request.

If the protection status of resource 1 indicates that resource 1 is still protected, the modification is not employed and a transmission can be sent back to the requestor indicating that the resource is still protected. In some embodiments, receiving a modification request for a protected can initiate the authorization process to unprotect the resource. For example, in response to receiving the modification request, the computing device can transmit authorization requests to the requestors 1-N indicated as possible requestors for the actor parties of the resource in the quorum data, notifying these requestors that the modification of the resource is requested, notifying the requestors of the identity of the particular requestor that requested the modification of the resource, notifying the requestors of the particular modification of the resource that is requested and/or otherwise requesting these requestors provide authorization to unprotect the resource if they wish. The authorizations can be received from at least one requestor wishing to provide authorization in response, and the quorum evaluation module 980 can determine whether quorum is reached as discussed in conjunction with FIG. 9B. If quorum is reached, the modification in the request can be facilitated.

In such embodiments, the unprotection status can be active only for the purpose for modifying the resource as requested in the modification request, for example, in cases where the notification indicates the requested modification and/or particular requestor of the modification, and/or where the authorizations correspond to authorization to perform this modification only. In such embodiments, only the modification in the request is facilitated and/or only modifications requested by this authorized requestor are facilitated. The resource remains protected against other subsequent modifications and/or against other modifications by different users unless quorum is also reached in this fashion for the other modifications and/or the other requestors.

The embodiments discussed in FIGS. 9A-9C illustrate the computing device 16 being implemented as a dispersed storage and task (DST) processing unit that communicates with a plurality of storage units storing encoded slices generated by the DST processing unit, operable to determine when an overall quorum is reached for modification of a resource stored as a plurality of encoded slices in a plurality of storage units. However, in other embodiments, the same functionality discussed herein can be utilized by any computing device that includes a processor and memory to determine when overall quorum is reached for a resource corresponding to any type of data that is not necessarily dispersed stored in memory, to unprotect the resource, and/or to facilitate modification of the resource, for example, stored in a single location and/or stored in local memory. Any computing device with a processor and memory that stores resources can be utilized to store quorum data for its resources stored in its memory or other memory to which it has access; receive authorizations from requestors to unprotect a resource stored in its memory or other memory to which it has access; implement the quorum evaluation module 980 or otherwise determine if an overall quorum has been achieved to unprotect a resource; monitor and/or modify the protection status of resources stored in its memory or other memory to which it has access; receive requests to modify unprotected and/or protected resources; implement the resource modification module 982 or otherwise facilitate modification of an unprotected resource stored in its memory or other memory to which it has access; and/or perform some or all of the other functionality of the computing device 916 discussed herein to determine when overall quorum is reached, to unprotect a corresponding resource, and/or to facilitate modification of the resource stored in a single location, dispersed stored in multiple locations, stored in local memory, and/or stored in other memory accessible via network 24.

In some embodiments, a storage unit 936 is implemented as such a computing device 916, for example, where encoded data slices that are received from a DST processing unit or other requesting entity for storage correspond to the resources, and where the storage unit 936 changes the status of encoded data slices from a protected to unprotected status for modification when an overall quorum is established as discussed herein. For example, the encoded data slices can be received by the storage unit 936 from another computing device 916 and/or from a computing device 16 that is operable to dispersed storage error encoded data into a plurality of data slices for storage in the plurality of storage units 936, and the storage unit 936 can maintain and change the protection status of the encoded data slices it receives and stores by utilizing a quorum evaluation module 980 and/or a resource modification module 982. Alternatively, the computing device 916 can implemented as any storage unit that can store any data locally in memory, for example, in response to write requests received from a requesting entity.

While FIGS. 9A-9C depict modification of resources in a DSN, the modification of resources can be authorized without utilizing the dispersed storage network of FIGS. 1-8. The computing device can be implemented utilizing any processor and memory to facilitate authorization to modify resources it manages as discussed herein, for example, by utilizing the quorum evaluation module 980 and/or the resource modification module 982. Alternatively or in addition, the resources can correspond to any data that is not necessarily dispersed stored. The resources can be stored locally by the computing device 916 in its own memory, or can be stored in another memory accessible via any communication network.

In various embodiments, some or all of the quorums data for some or all of the resources 1-R can be considered additional resources themselves. Thus, the quorum data can similarly be protected, where the quorum data for a particular resource can only be modified if a similar, additional quorum is met for the additional resource corresponding to the quorum data. For example, multiple client devices 955 and/or multiple administrators of one or more actor parties can be required to authorize changes to the quorum data for one or more resources in accordance with additional quorum data for the resource corresponding to the quorum data, where the additional quorum data similarly defines minimum quorums required for one or more designated actor parties as discussed herein. This additional quorum data can be fixed, can be defined via client device 955, and/or can be modified in accordance with its own, further additional quorum.

In various embodiments, a processing system of a dispersed storage and task (DST) processing unit or other computing device includes at least one processor and a memory that stores operational instructions, that when executed by the at least one processor cause the processing system to facilitate storage of a resource in memory managed by the computing device, such as a dispersed storage network. A protection status of the resource is set to a protected status in response to facilitating storage of the resource. A set of actor parties required to authorize a change of the protection status of the resource from the protected status to an unprotected status are determined. A minimum quorum is determined for each of the set of actor parties required to authorize a change of the protection status of the resource from the protected status to the unprotected status. A plurality of authorizations to change the protection status of the resource from the protected status to the unprotected status from a plurality of requestors are received from a plurality of requestors via the network. A plurality of subsets of the plurality of requestors are identified, where each one of the plurality of subsets corresponds to one of the set of actor parties. The protection status of the resource is set to the unprotected status in response to determining, for every one of the set of actor parties, that a number of requestors in a corresponding one of the plurality of subsets of the plurality of requestors is greater than or equal to the minimum quorum for the one of the set of actor parties. This system can be utilized to prevent a single malicious actor from abusing the unprotect mechanism while also assuring an end user that their protected resources cannot be unprotected without their consent.

Figure 10:
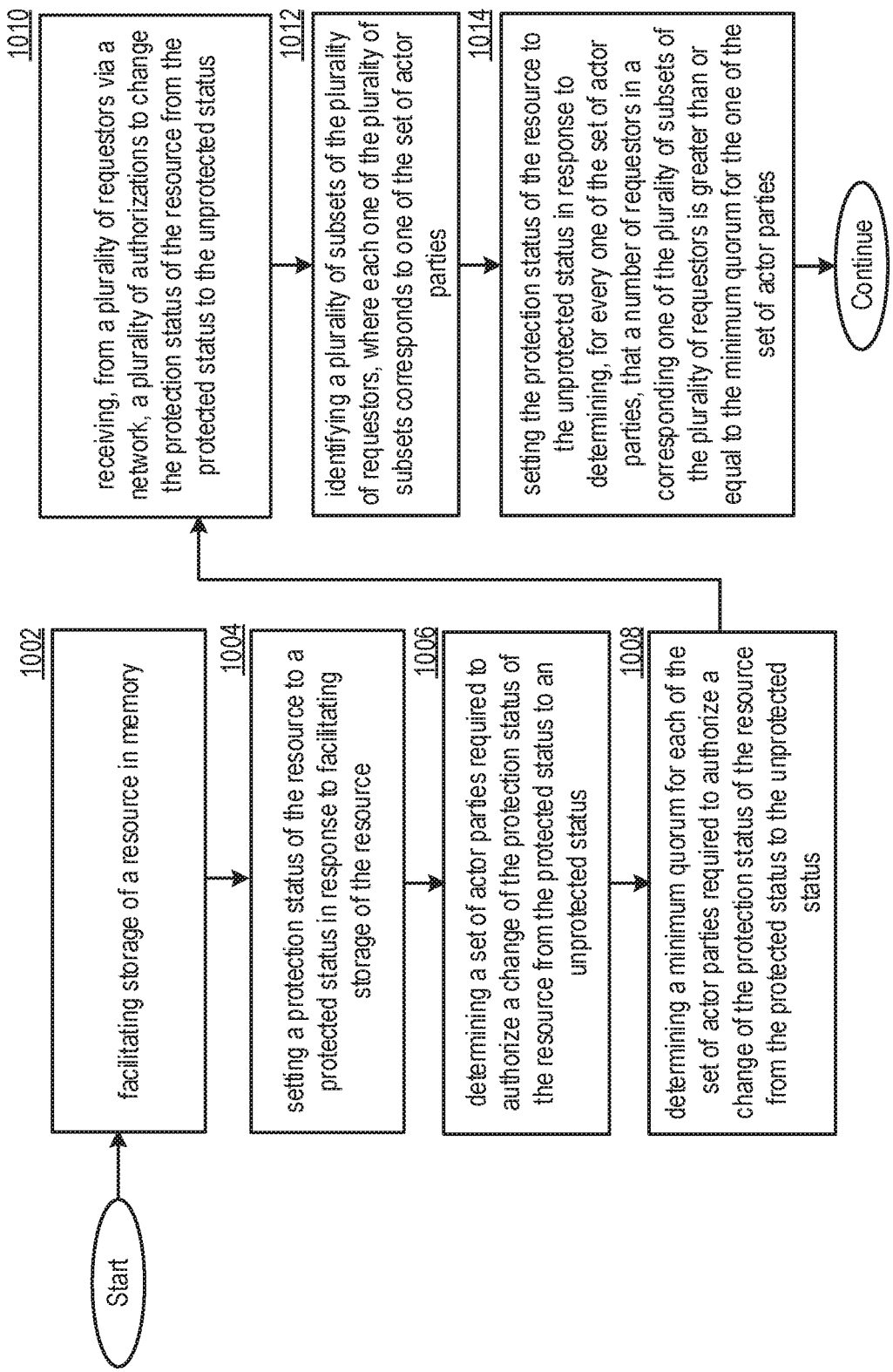
FIG. 10 is a logic diagram of an example of a method of authorizing modification of resources in accordance with the present invention.

FIG. 10 is a flowchart illustrating an example of authorizing modifications of resources, for example, in a DSN. In particular, a method is presented for use in association with one or more functions and features described in conjunction with FIGS. 1-9C, for execution by a computing device such as a dispersed storage and task (DST) processing unit, a storage unit, or another device, for example, of the DSN. The computing device can include at least one processor and memory that stores instruction that configure the processor or processors to perform the steps described below.

Step 1002 includes facilitating storage of a resource in memory, for example, managed by the computing device, such as a dispersed storage network. Step 1004 includes setting a protection status of the resource to a protected status in response to facilitating storage of the resource. Step 1006 includes determining a set of actor parties required to authorize a change of the protection status of the resource from the protected status to an unprotected status. Step 1008 includes determining a minimum quorum for each of the set of actor parties required to authorize a change of the protection status of the resource from the protected status to the unprotected status. Step 1010 includes receiving, from a plurality of requestors via a network, a plurality of authorizations to change the protection status of the resource from the protected status to the unprotected status. Step 1012 includes identifying a plurality of subsets of the plurality of requestors, where each one of the plurality of subsets corresponds to one of the set of actor parties. Step 1014 includes setting the protection status of the resource to the unprotected status in response to determining, for every one of the set of actor parties, that a number of requestors in a corresponding one of the plurality of subsets of the plurality of requestors is greater than or equal to the minimum quorum for the one of the set of actor parties.

In various embodiments, the method further includes receiving, via the network, a request indicating a modification of the resource. The method further includes facilitating the modification of the resource in response to determining the protection status of the resource is set as the unprotected status. In various embodiments, the request is received from one of the plurality of requestors, and the modification of the resource is facilitated in further response to determining that the one of the plurality of requestors corresponds to one of the set of actor parties.

In various embodiments, the method further includes maintaining the protection status of the resource as the protected status in response to determining, for one of the set of actor parties, that the number of requestors in the corresponding one of the plurality of subsets of the plurality of requestors is less than the minimum quorum for the one of the set of actor parties. For example, this step can replace step 1014 when it is determined, for one of the set of actor parties, that the number of requestors in the corresponding one of the plurality of subsets of the plurality of requestors is less than the minimum quorum for the one of the set of actor parties.

In various embodiments, identifying the plurality of subsets of the plurality of requestors includes extracting credential data from at least one of the plurality of authorizations. Each one of the plurality of subsets includes only ones of the plurality of requestors with credential data extracted from corresponding ones of the plurality of authorizations indicating the ones of the plurality of requestors are validated as members of one of the set of actor parties corresponding to the one of the plurality of subsets. In various embodiments, at least one of the plurality of requestors is included in none of the plurality of subsets in response to determining that the credential data for the at least one of the plurality of requestors indicates the at least one of the plurality of requestors is not validated as a member of any of the set of actor parties.

In various embodiments, a number of actor parties in the set of actor parties is greater than one, and the minimum quorum for each the set of actor parties is greater than or equal to one. In various embodiments, a first one of the set of actor parties corresponds to an owner party, and a second one of the set of actor parties corresponds to an operator party. The owner party corresponds to a plurality of end users, and the operator party includes a single operator. The minimum quorum for the operator party is equal to one, and the protection status of the resource is set to the unprotected status in response to determining that the number of requestors in a first one of the plurality of subsets of the plurality of requestors corresponding to the owner party is greater than or equal to a minimum quorum for the owner party, and/or in further response to determining that the number of requestors in a second one of the plurality of subsets of the plurality of requestors corresponding to the operator party includes the single operator. In various embodiments, the method includes determining the plurality of end users in the owner party based on identifying a plurality of end users corresponding to the resource. In various embodiments, the minimum quorum for the owner party is greater than one.

In various embodiments, an additional actor party corresponds to an arbitrator party. The method further includes identifying an arbitrator subset of the plurality of requestors, where the arbitrator subset includes ones of the plurality of requestors corresponding to the arbitrator party. The method further includes determining, for exactly one of the set of actor parties, that a number of requestors in a corresponding one of the plurality of subsets of the plurality of requestors is less than the minimum quorum for the one of the set of actor parties. The method further includes setting the protection status of the resource to the unprotected status in response to determining, for all remaining ones of the set of actor parties, that a number of requestors in a corresponding one of the plurality of subsets of the plurality of requestors is greater than or equal to the minimum quorum for the one of the set of actor parties, and/or in response to further determining that a number of requestors in the arbitrator subset is greater than or equal to a minimum quorum for the one of the set of actor parties.

In various embodiments, the method includes receiving minimum quorum selection data. For example, the minimum quorum selection data was generated by a client device corresponding to an administrator based on user input to a graphical user interface in response to a prompt presented by the graphical user interface, where the graphical user interface was displayed by a display device of the client device. The minimum quorum is determined for each of the set of actor parties based on the minimum quorum selection data. In various embodiments, a sum of minimum quorums for all of the set of actor parties is greater than one in response to the prompt presented by the graphical user interface requiring the minimum quorum selection data to adhere to a number of actor parties in the set of actor parties being greater than one, and the minimum quorum for each the set of actor parties being greater than or equal to one.

In various embodiments, the minimum quorum for at least one of the set of actor parties is calculated as a function of a number of possible requestors included in the at least one of the set of actor parties, where the number of possible requestors included in the at least one of the set of actor parties is greater than one.

In various embodiments, the computing device is implemented as a dispersed storage and task (DST) processing unit, and the resource includes a data segment. Facilitating storage of the resource includes dispersed storage error encoding the data segment to produce a set of encoded data slices for storage in a set of storage units and further includes transmitting the set of encoded data slices for storage to the set of storage units via the network. Facilitating modification of the resource can include facilitating replacement of the resource by a modified resource by dispersed storage error encoding a data segment of the modified resources to produce a set of updated encoded data slices to replace the set of original encoded data slices for the original data segment in the set of storage units. The set of updated encoded data slices can be transmitted for storage to the set of storage units via the network, and some or all of the set of storage units can replace an original encoded data slice with a received updated encoded data slice.

In various embodiments, the computing device 916 is implemented as a storage unit, and the resource corresponds to an encoded data slice. The encoded data slice is received for storage from a DST processing unit. The DST processing unit generated the encoded data slice by dispersed storage error encoding a data segment to produce a set of encoded data slices that includes the encoded data slice for storage in a set of storage units that includes the storage unit. Facilitating storage of resource includes storing the encoded data slice in a memory device of the storage unit.

In various embodiments, a non-transitory computer readable storage medium includes at least one memory section that stores operational instructions that, when executed by a processing system, for example, of a dispersed storage network (DSN), that includes a processor and a memory, causes the processing system to facilitate storage of a resource in memory of the dispersed storage network or other memory associated with the processing system. A protection status of the resource is set to a protected status in response to facilitating storage of the resource. A set of actor parties required to authorize a change of the protection status of the resource from the protected status to an unprotected status are determined. A minimum quorum is determined for each of the set of actor parties required to authorize a change of the protection status of the resource from the protected status to the unprotected status. A plurality of authorizations to change the protection status of the resource from the protected status to the unprotected status from a plurality of requestors are received from a plurality of requestors via the network. A plurality of subsets of the plurality of requestors are identified, where each one of the plurality of subsets corresponds to one of the set of actor parties. The protection status of the resource is set to the unprotected status in response to determining, for every one of the set of actor parties, that a number of requestors in a corresponding one of the plurality of subsets of the plurality of requestors is greater than or equal to the minimum quorum for the one of the set of actor parties.

Figure 11:
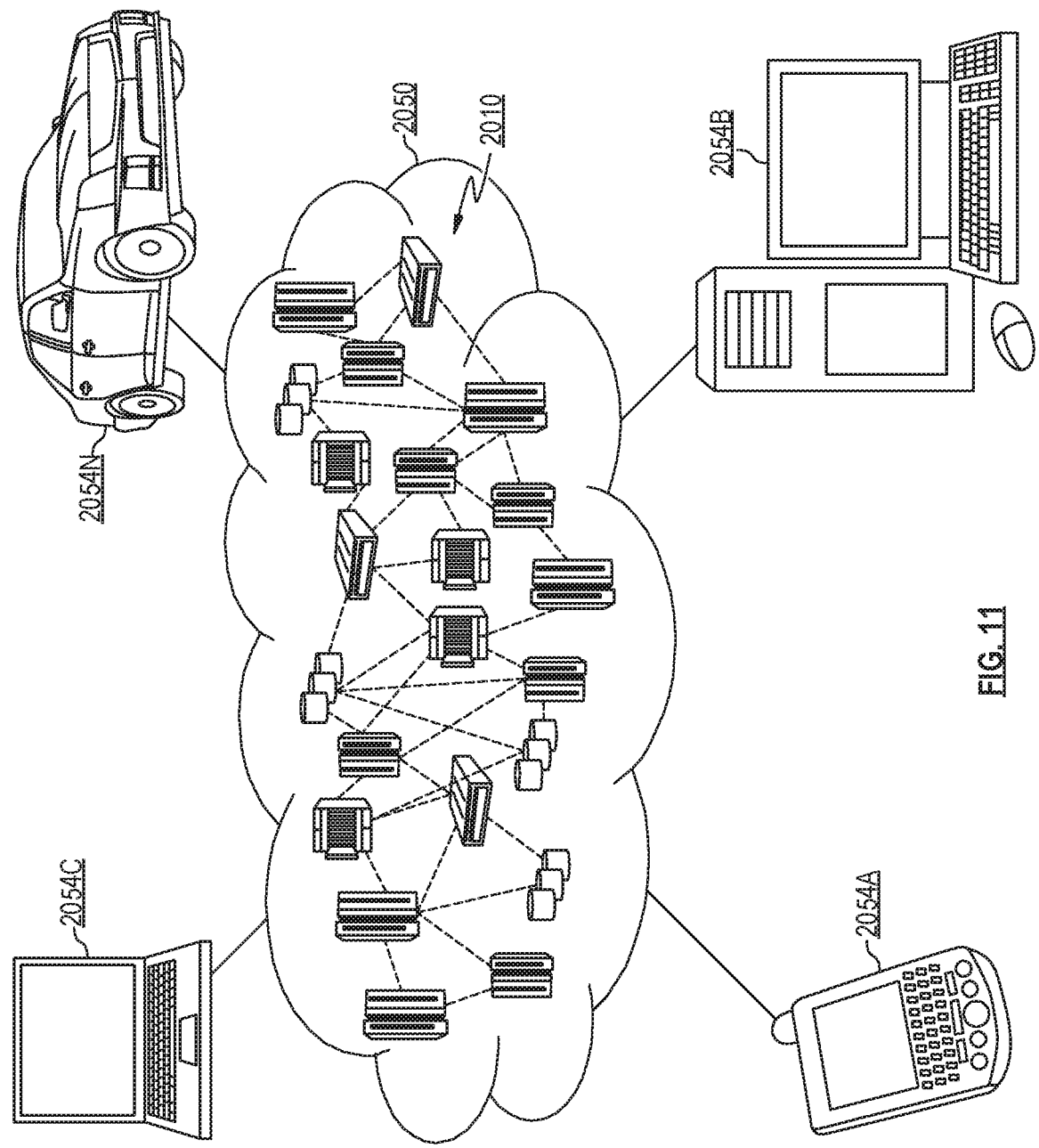
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
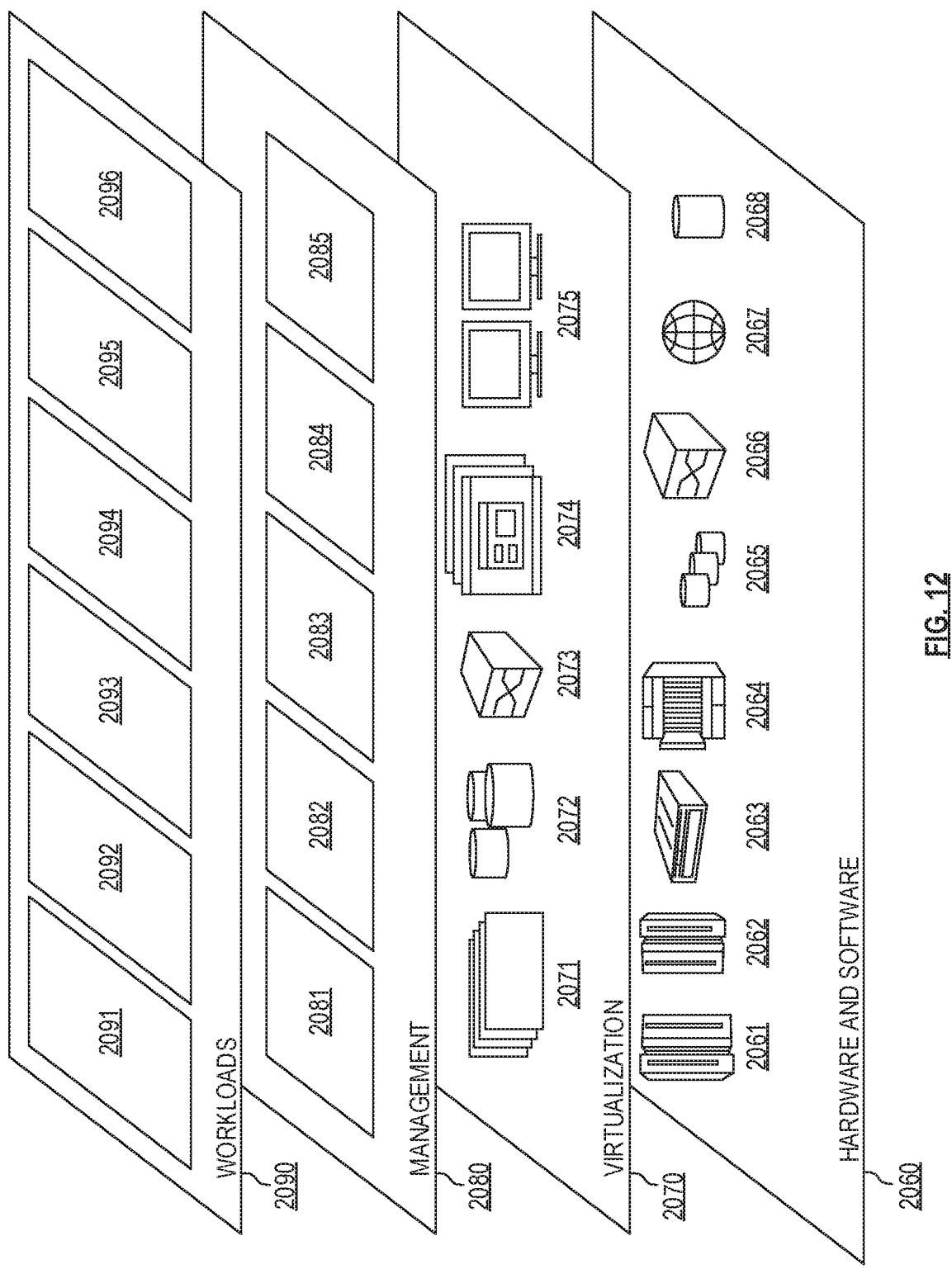
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and resource modification authorization 2096. In some embodiments, the DSN 10 can utilize utilizing the cloud computing environment 2050, for example, by utilizing the resource modification authorization 2096 of the workloads layer 2090 of FIG. 12 to perform authorization to modify resources in the DSN, based on latency and/or throughput, as described in conjunction with FIGS. 1-10, where some or all computing devices 12-16 of FIG. 1 and/or where one or more computing devices 916 of FIGS. 9A-9C communicate with the network via a corresponding node 2010 of the cloud computing environment 2050.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a that includes a processor, the method comprises:
   receiving a resource to be stored in a dispersed storage network (DSN), the DSN comprising a DSN processing unit and plural DSN storage units;
   storing the resource in the DSN by:
      disperse storage error encoding one or more data segments of the resource into a plurality of encoded data slices; and
      transmitting the plurality of encoded data slices to a number of the DSN storage units such that the encoded data slices are written to respective memories in the number of the DSN storage units;
   maintaining protection status information in local memory, wherein the protection status information defines a protection status of the resource as one of a protected status and an unprotected status;
   automatically setting the protection status to the protected status at a time of the writing of the encoded data slices, wherein the resource can be read in the DSN but cannot be modified or deleted in the DSN while the protection status is the protected status, wherein the protection status is configured to be maintained as the protected status until a protection period has elapsed, and the protection status is configured to be automatically changed from the protected status to the unprotected status based on determining that the protection period has elapsed;
   determining a set of actor parties required to authorize a change of the protection status of the resource from the protected status to the unprotected status;
   determining a minimum quorum for each of the set of actor parties required to authorize a change of the protection status of the resource from the protected status to the unprotected status;
   receiving, from a plurality of requestors via a network, a plurality of authorizations to change the protection status of the resource from the protected status to the unprotected status;
   identifying a plurality of subsets of the plurality of requestors, wherein each one of the plurality of subsets corresponds to one of the set of actor parties; and
   setting the protection status of the resource to the unprotected status in response to determining, for every one of the set of actor parties, that a number of requestors in a corresponding one of the plurality of subsets of the plurality of requestors is greater than or equal to the minimum quorum for the one of the set of actor parties.

2. The method of claim 1, further comprising:
   receiving, via the network, a request indicating a modification of the resource; and
   facilitating the modification of the resource in response to determining the protection status of the resource is set as the unprotected status.

3. The method of claim 2, wherein the request is received from one of the plurality of requestors, and wherein the modification of the resource is facilitated in further response to determining that the one of the plurality of requestors corresponds to one of the set of actor parties.

4. The method of claim 1, further comprising:
   maintaining the protection status of the resource as the protected status in response to determining, for one of the set of actor parties, that the number of requestors in the corresponding one of the plurality of subsets of the plurality of requestors is less than the minimum quorum for the one of the set of actor parties.

5. The method of claim 1, wherein identifying the plurality of subsets of the plurality of requestors includes extracting credential data from at least one of the plurality of authorizations, and wherein each one of the plurality of subsets includes only ones of the plurality of requestors with credential data extracted from corresponding ones of the plurality of authorizations indicating the ones of the plurality of requestors are validated as members of one of the set of actor parties corresponding to the one of the plurality of subsets.

6. The method of claim 5, wherein at least one of the plurality of requestors is included in none of the plurality of subsets in response to determining that the credential data for the at least one of the plurality of requestors indicates the at least one of the plurality of requestors is not validated as a member of any of the set of actor parties.

7. The method of claim 1, wherein a number of actor parties in the set of actor parties is greater than one, and wherein the minimum quorum for each the set of actor parties is greater than or equal to one.

8. The method of claim 7, wherein a first one of the set of actor parties corresponds to an owner party, wherein a second one of the set of actor parties corresponds to an operator party, wherein the owner party corresponds to a plurality of end users, wherein the operator party includes a single operator, wherein the minimum quorum for the operator party is equal to one, and wherein the protection status of the resource is set to the unprotected status in response to determining that the number of requestors in a first one of the plurality of subsets of the plurality of requestors corresponding to the owner party is greater than or equal to a minimum quorum for the owner party, and in further response to determining that the number of requestors in a second one of the plurality of subsets of the plurality of requestors corresponding to the operator party includes the single operator.

9. The method of claim 8, further comprising determining the plurality of end users in the owner party based on identifying a plurality of end users corresponding to the resource.

10. The method of claim 8, wherein the minimum quorum for the owner party is greater than one.

11. The method of claim 7, wherein an additional actor party corresponds to an arbitrator party, further comprising:
    identifying an arbitrator subset of the plurality of requestors, wherein the arbitrator subset includes ones of the plurality of requestors corresponding to the arbitrator party;
    determining, for exactly one of the set of actor parties, that a number of requestors in a corresponding one of the plurality of subsets of the plurality of requestors is less than the minimum quorum for the one of the set of actor parties; and
    setting the protection status of the resource to the unprotected status in response to determining, for all remaining ones of the set of actor parties, that a number of requestors in a corresponding one of the plurality of subsets of the plurality of requestors is greater than or equal to the minimum quorum for the one of the set of actor parties, and in response to further determining that a number of requestors in the arbitrator subset is greater than or equal to a minimum quorum for the one of the set of actor parties.

12. The method of claim 1, further comprising:
receiving minimum quorum selection data, wherein the minimum quorum selection data was generated by a client device corresponding to an administrator based on user input to a graphical user interface in response to a prompt presented by the graphical user interface, wherein the graphical user interface was displayed by a display device of the client device;
wherein the minimum quorum is determined for each of the set of actor parties based on the minimum quorum selection data.

13. The method of claim 12, wherein a sum of minimum quorums for all of the set of actor parties is greater than one in response to the prompt presented by the graphical user interface requiring the minimum quorum selection data to adhere to a number of actor parties in the set of actor parties being greater than one, and the minimum quorum for each the set of actor parties being greater than or equal to one.

14. The method of claim 1, wherein the minimum quorum for at least one of the set of actor parties is calculated as a function of a number of possible requestors included in the at least one of the set of actor parties, and wherein the number of possible requestors included in the at least one of the set of actor parties is greater than one.

15. A processing system of a computing device comprises:
at least one processor;
a memory that stores operational instructions, that when executed by the at least one processor cause the processing system to:
receive a resource to be stored in a dispersed storage network (DSN), the DSN comprising a DSN processing unit and plural DSN storage units;
store the resource in the DSN by:
disperse storage error encoding one or more data segments of the resource into a plurality of encoded data slices; and
transmitting the plurality of encoded data slices to a number of the DSN storage units such that the encoded data slices are written to respective memories in the number of the DSN storage units;
maintain protection status information in local memory, wherein the protection status information defines a protection status of the resource as one of a protected status and an unprotected status;
automatically set the protection status to the protected status at a time of the writing of the encoded data slices, wherein the resource can be read in the DSN but cannot be modified or deleted in the DSN while the protection status is the protected status, wherein the protection status is configured to be maintained as the protected status until a protection period has elapsed, and the protection status is configured to be automatically changed from the protected status to the unprotected status based on determining that the protection period has elapsed;
determine a set of actor parties required to authorize a change of the protection status of the resource from the protected status to the unprotected status before the protection period has elapsed;
determine a minimum quorum for each of the set of actor parties required to authorize a change of the protection status of the resource from the protected status to the unprotected status;
receive, from a plurality of requestors via a network, a plurality of authorizations to change the protection status of the resource from the protected status to an unprotected status;
identify a plurality of subsets of the plurality of requestors, wherein each one of the plurality of subsets corresponds to one of the set of actor parties; and
set the protection status of the resource to the unprotected status before the protection period has elapsed and in response to determining, for every one of the set of actor parties, that a number of requestors in a corresponding one of the plurality of subsets of the plurality of requestors is greater than or equal to the minimum quorum for the one of the set of actor parties.

16. The processing system of claim 15, wherein the operational instructions, when executed by the at least one processor, further cause the processing system to:
receive, via the network, a request indicating a modification of the resource; and
facilitate the modification of the resource in response to determining the protection status of the resource is set as the unprotected status.

17. The processing system of claim 15, wherein identifying the plurality of subsets of the plurality of requestors includes extracting credential data from at least one of the plurality of authorizations, and wherein each one of the plurality of subsets includes only ones of the plurality of requestors with credential data extracted from corresponding ones of the plurality of authorizations indicating the ones of the plurality of requestors are validated as members of one of the set of actor parties corresponding to the one of the plurality of subsets.

18. A non-transitory computer readable storage medium comprises:
at least one memory section that stores operational instructions that, when executed by a processing system that includes a processor and a memory, causes the processing system to:
receive a resource to be stored in a dispersed storage network (DSN), the DSN comprising a DSN processing unit and plural DSN storage units;
store the resource in the DSN by:
disperse storage error encoding one or more data segments of the resource into a plurality of encoded data slices; and
transmitting the plurality of encoded data slices to a number of the DSN storage units such that the encoded data slices are written to respective memories in the number of the DSN storage units;
maintain protection status information in local memory, wherein the protection status information defines a protection status of the resource as one of a protected status and an unprotected status;
automatically set the protection status to the protected status at a time of the writing of the encoded data slices, wherein the resource can be read in the DSN but cannot be modified or deleted in the DSN while the protection status is the protected status;
determine a set of actor parties required to authorize a change of the protection status of the resource from the protected status to an unprotected status;
determine a minimum quorum for each of the set of actor parties required to authorize a change of the protection status of the resource from the protected status to the unprotected status;

receive, from a plurality of requestors via a network, a plurality of authorizations to change the protection status of the resource from the protected status to an unprotected status;

identify a plurality of subsets of the plurality of requestors, wherein each one of the plurality of subsets corresponds to one of the set of actor parties; and set the protection status of the resource to the unprotected status in response to determining, for every one of the set of actor parties, that a number of requestors in a corresponding one of the plurality of subsets of the plurality of requestors is greater than or equal to the minimum quorum for the one of the set of actor parties.

19. The method of claim 1, wherein the number of the DSN storage units equals an information dispersal algorithm (IDA) width threshold number.

20. The method of claim 19, wherein the computing device is the DSN processing unit.

* * * * *